J. A. BURT.
GAME.
APPLICATION FILED OCT. 27, 1916.

1,235,435.

Patented July 31, 1917.

WITNESSES
Frederick Diehl.
C. S. Murdock

INVENTOR
Julia A. Burt
BY Munn & Co.
ATTORNEYS

UNITED STATES PATENT OFFICE.

JULIA A. BURT, OF BROOKLYN, NEW YORK.

GAME.

1,235,435. Specification of Letters Patent. Patented July 31, 1917.

Application filed October 27, 1916. Serial No. 128,038.

*To all whom it may concern:*

Be it known that I, JULIA A. BURT, a citizen of the United States, and a resident of the city of New York, borough of Brooklyn, in the county of Kings and State of New York, have invented a new and Improved Game, of which the following is a full, clear, and exact description.

Among the principal objects which the present invention has in view are: to familiarize a student with the location of musical symbols on the staff and leger lines adjunctive thereto; to lend attraction to the educational feature; and to form a game, the playing of which has an instructive result.

Drawings.

Figure 1:
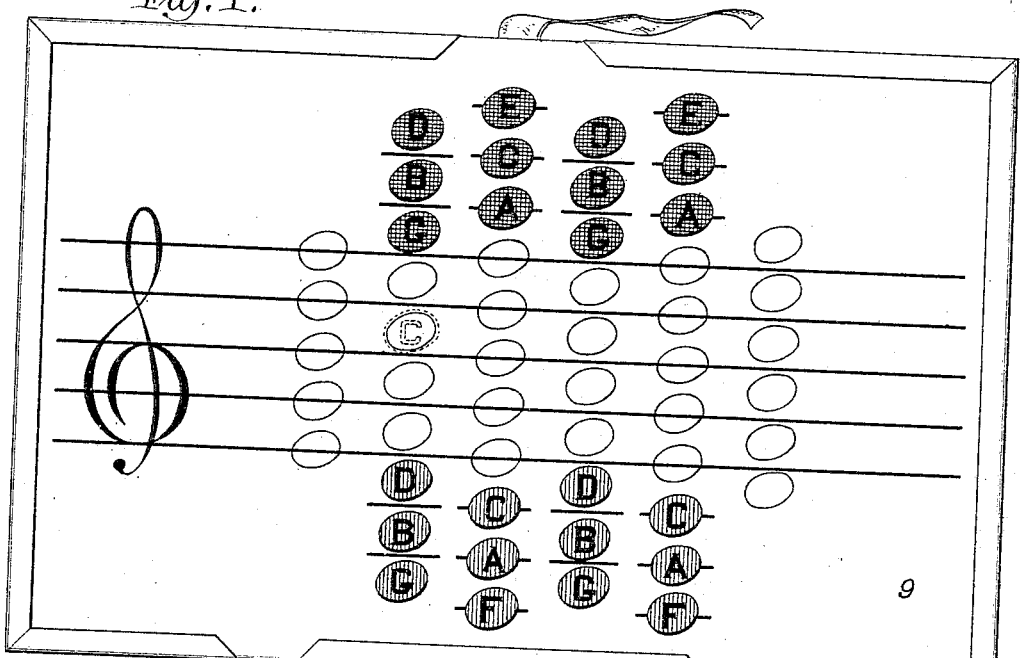
Figure 1 is a view of the staff of the treble clef with tokens or movable members wherewith to play a game thereon.

Description.

As seen in the drawings, a chart 9 is provided with a staff of five parallel lines comprising the usual lines and spaces of a musical staff. Above and below the staff a series of leger lines are provided, the series forming three or more rows in each instance. These leger lines are disposed in relative alinement.

Figure 4:
Fig. 4 is a similar view showing the reverse face of said token.

The staff has imprinted thereon a series of ovals which are employed in the game as resting spots for the disks 10. The disks 10 are preferably oval in shape as most nearly conforming to the shape of musical notes. The disks 10 have imprinted on the obverse face, a character generally the letter assigned to some space or line of the staff for musical guidance. The reverse side as shown in Fig. 4 of the drawings is generally plain.

Figure 2:
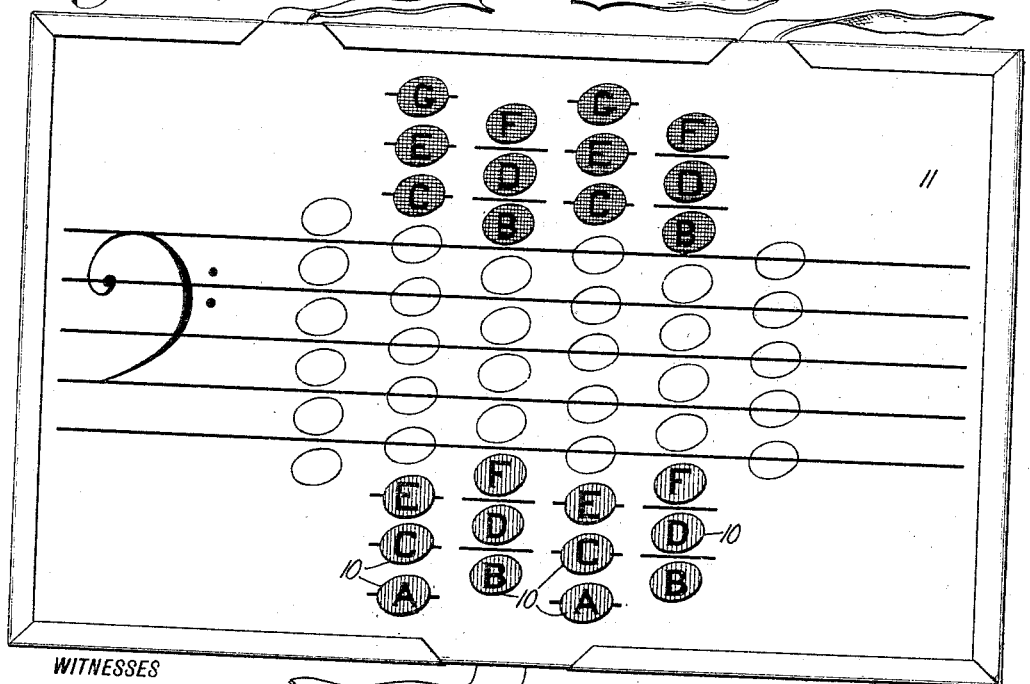
Fig. 2 is a similar view of the staff of the bass clef having the tokens or movable members arranged thereon in disposition prior to starting the game.
Figure 3:
Fig. 3 is a view of a token showing the obverse face thereof.

A second chart 11 is provided, the staff thereon having the sign of the bass clef, and the leger lines being arranged in accordance with those imprinted on the chart 9. The notes indicated by the said leger lines and spaces therebetween on the bass clef are relatively different, as will be seen by observing the letters on the disks 10 shown in Fig. 2 of the drawings.

To play this game of musical checkers, as this game is denominated, two sets of disks 10 having some distinguishing color are arranged at opposite sides of the staff on the leger lines and in the spaces provided between said leger lines. The movements of the disks 10 correspond closely to the movements of the men in the game of checkers, that is, the movements are diagonal, and it is the privilege in the movement of each man to jump a man of the opposing side whenever a clear space is offered at the rear of the said man of the opposing side.

A characteristic difference between the game of checkers and the present game is that in the former the players sit on opposite sides of the board, while in the present game they sit on the same side with the musical clef at the left.

Another characteristic difference between the movement of the men in the present game and that of the game of checkers, is that in the game of checkers the man is moved to the extreme of the field before being crowned, whereas in the present game the man is crowned whenever he attains the space or line in the staff to which he rightfully belongs by reason of the correspondence of his letter designation with the letter designation of the line or space of the said staff.

Thus referring to the drawings, if the man "C" at the lower side of Fig. 1 is manipulated to reach the space "C" shown by dotted lines on the staff in said figure, he is then crowned. Should the man "C" be jumped over the king row, as frequently occurs, the same would be crowned and acquire the same privilege as the king men, that is, of moving either up or down. This throws an element of manipulation or design into the game not found in the above-mentioned game of checkers.

At the end of the game, as in the game of checkers, the player loses whose men are captured by being jumped or by being placed in a position where if they moved they would be jumped.

Owing to the fact that each man being handled by a player has a different king row, which king row corresponds with the location of the letter-designated note, the player quickly becomes acquainted with the letter designation of the various locations on the staff. This is also true of the letter-designated locations on the leger lines as the player is forced to know these in order to place the men in preparation for playing the game. The ultimate result is to familiarize the players with the letter-designated locations of the staves of both the treble and bass clefs inclusive of the leger lines extended above and below the same.

*Claims.*

1. A game comprising a chart having imprinted thereon parallel lines arranged in simulation of a musical staff and leger lines associated therewith; and a plurality of movable game pieces each having a designating mark corresponding with the designation of some one of the lines or spaces on said staff.

2. A game comprising a chart having imprinted thereon parallel lines arranged in simulation of a musical staff and a series of leger lines, said leger lines being disposed at opposite sides of said staff and arranged to provide setting locations for movable game members; and a plurality of movable game members each having a designating mark corresponding with the designation of some one of the lines or spaces on said staff.

3. A game comprising a plurality of charts, each of said charts having imprinted thereon parallel lines arranged in simulation of a musical staff, and leger lines associated therewith one of said staves bearing the sign of the treble clef and the other of said staves bearing the sign of the bass clef; and a plurality of movable members each having a designating mark corresponding with the designation of some one of the lines or spaces on said staves.

4. A game comprising a plurality of charts, each chart having imprinted thereon parallel lines arranged in simulation of a musical staff and a series of leger lines, said leger lines being disposed at opposite sides of said staff and arranged to provide setting locations for movable game members, one of said staves bearing the sign of the treble clef and the other of said staves bearing the sign of the bass clef; and a plurality of movable game members, each having a designating mark corresponding with the designation of some one of the lines or spaces on said staves.

JULIA A. BURT.